United States Patent [19]

Bartenstein

[11] 3,872,394

[45] Mar. 18, 1975

[54] PILOT REGULATED CARRIER FREQUENCY LINE AMPLIFIER

[75] Inventor: Peter Bartenstein, Munich, Germany

[73] Assignee: Siemens Aktiengesellschaft, Berlin and Munich, Germany

[22] Filed: May 11, 1973

[21] Appl. No.: 359,272

[30] Foreign Application Priority Data

Apr. 18, 1973 Germany ........................... 2319784
May 19, 1972 Germany ........................... 2224621

[52] U.S. Cl. ........................ 330/52, 330/85, 330/26, 330/86

[51] Int. Cl. ........................ H03f 3/66

[58] Field of Search ........................ 330/52, 86

[56] References Cited

UNITED STATES PATENTS

| | | | |
|---|---|---|---|
| 2,298,192 | 10/1942 | Bollman | 330/86 |
| 3,435,360 | 3/1969 | Carroll | 330/52 X |
| 3,510,793 | 5/1970 | Barber | 330/52 |

FOREIGN PATENTS OR APPLICATIONS

| | | | |
|---|---|---|---|
| 211,430 | 4/1956 | Australia | 330/52 |

*Primary Examiner*—Nathan Kaufman
*Attorney, Agent, or Firm*—Hill, Gross, Simpson, Van Santen, Steadman, Chiara & Simpson

[57] ABSTRACT

A pilot controlled carrier frequency line amplifier comprises a feedback network which determines the frequency passage. The network includes an indirectly heated resistor which is controlled by means of a control arrangement which evaluates the pilot. The control arrangement includes a collector-emitter path of a limiting transistor in parallel to the heated resistor which is effective to shunt current supplied as an indication of the difference between the carrier and a reference. The limiting transistor is provided with a base voltage divider which is connected to control the operation of the limiting transistor. The heated resistor is included in the feedback network and is variable in response to the amount of current supplied for heating the resistor so as to increase or decrease the amplification of the line amplifier. The limiting transistor is further employed for temperature compensation with respect to the surrounding temperatures.

4 Claims, 5 Drawing Figures

PATENTED MAR 1 8 1975 3,872,394

SHEET 3 OF 4

PILOT REGULATED CARRIER FREQUENCY LINE AMPLIFIER

This invention relates to a pilot regulated carrier frequency line amplifier, and is more particularly concerned with such a line amplifier in which a feedback network is provided for determining the frequency characteristic of the amplifier by means of heating a temperature responsive resistor for controlling the pass characteristics of the amplifier in accordance with the magnitude of the pilot.

SUMMARY OF THE INVENTION

It is the primary object of the present invention to secure the stability of a feedback network in a line amplifier which is controlled by the pilot in the feedback path under any and all operational conditions.

According to the invention the foregoing object is achieved in that the collector-emitter path of a limiting transistor is connected in parallel with the heating element of the heated resistor in the feedback path and a base voltage divider is also provided in parallel therewith and has a top connected to the base of the limiting transistor.

By applying the above measure, the advantage arises wherein with large values of output voltage of the control arrangement (corresponding to low levels of pilot) and in all operational or surrounding temperatures, respectively, the line amplifier can be controlled up to a very accurately prescribed maximum amplification at which the stability of the feedback network is secured without exceeding a limit for amplification of the stage.

In a further embodiment of the invention a transistor is employed which assesses the output voltage of the control arrangement. A temperature dependent resistor is connected to this transitor and can be connected in a way in which a transistor supplying an additional current to the heating path of the heating conductor such that the additonal current takes a prescribed value with respect to lower values of the output voltage of the control arrangement so that this value is larger in the case of low surrounding temperaturs then in the case of higher surrounding temperatures. The additional current is decreased in the case of an increase in output voltage of the control arrangement. A further advantage arises, namely that in case of small values of the output voltage of the control arrangement (corresponding to high pilot levels) or in case of failure or passing of the control arrangement, respectively and in all operational or surrounding temperatures, respectively, the line amplifier can be controlled up to a very accurately prescribed maximum amplification, at which the stability of the feedback network maintains a sufficient security distance with respect to self excitation (as seen on a Polar plot) without the limit for safe amplification increase being exceeded.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Figure 1:
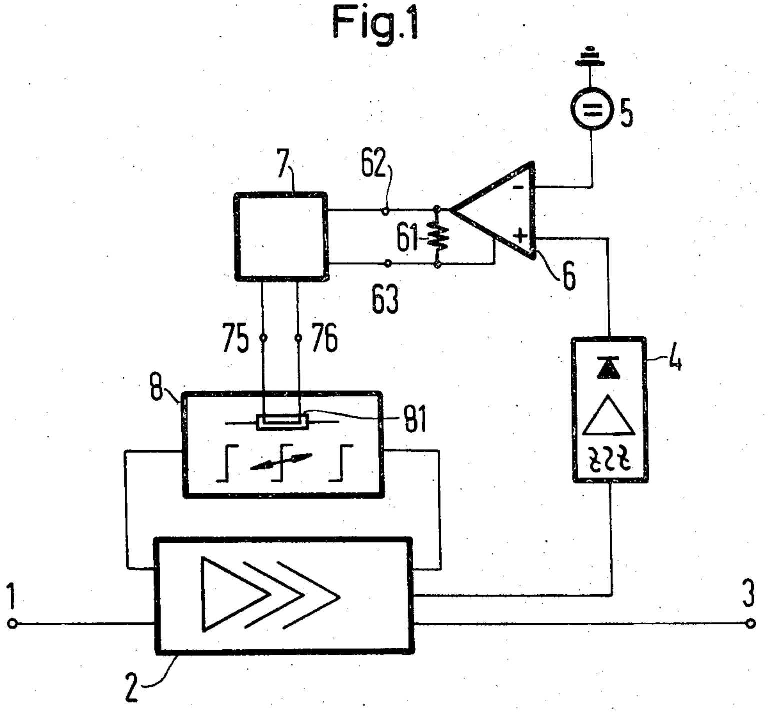
FIG. 1 is a schematic representation of a pilot controlled carrier frequency line amplifier.

Referring to FIG. 1, a pilot controlled carrier frequency line amplifier is illustrated, which in case of the carrier frequency system known by the designation V10800 transmits a frequency band of 4–60 MHz. The line amplifier includes an input 1 connected to a, for example, three stage active part 2 which has an output 3. The active part 2 is strongly counter coupled by way of a feedback network 8 which determines the frequency characteristic of the amplifier.

The feedback network 8 contains, in addition to a plurality of nonillustrated rectifying elements, a heating conductor 81 for indirectly heating a resistor and is designed in such a way that primarily the frequency dependent damping of the respective path section is balanced. Since, however, the entire line paths consists, for the major part, of path sections which damping is only balanced by temperature controlled line amplifiers, the pilot controlled amplifier has the task of balancing in addition the damping errors which occur in the paths which can only be temperature controlled.

A line pilot which is located at the upper end of a transmission band is utilized for the accurate level control, whereby this line pilot is filtered from the output signal of the line amplifier by means of a pilot amplifier 4 and is accordingly amplified and rectified as indicated in FIG. 1. The rectified pilot voltage is compared to the voltage of a reference source 5 in a subsequently connected differential amplifier 6 which serves as a control arrangement. The differential amplifier 6 includes a pair of output terminals 62 and 63 which are connected to a limitation arrangement 7 and directs, in the presence of the desired pilot level at the output 3 of the line amplifier, a medium direct current of, for example, 16 mA to the heating coil of the indirectly heated resistor 81.

The indirectly heated resistor 81 forms part of the feedback network 8 and determines the amplification of the line amplifier between the output 3 and the input 1. In case of a very strong reverse coupling via a very wide frequency range with a group of frequency characteristics which are prescribed by the features of a transmission cable, the admissible variability of the amplification in case of sufficient stability of the feedback loop is greatly limited. The polar frequency response locus which illustrates the loop amplification serves for the assessment of stability. In the range of positive loop amplification a sufficiently large phase distance and in the range around the zero passage of the phase a sufficient damping of the amount of loop amplification is required.

If the amplication of the line amplifier is decreased (by decreasing the heating current of the resistor 81) the loop amplification in the feedback loop will increase and the phase distance will diminish.

However, in case of an increase of the amplification of the line amplifier (by increasing the heating current) the amount of loop amplification in the area of the zero passage of the phase will decrease.

It is the aim of the invention to secure the line amplifier against self excitation in the case of deviations of energy supplied to the heating conductor 81, and above all in all occurring operations of the line amplifier in a total range of regulator output. The total range of regulator output of the output voltage at the output terminal 62 and 63 of the differential amplifier 6 causes an inadmissible high variation of amplification, which due to the deviations of the energy supplied to the heating conductor, do not lie generally symmetrical with respect to the medium amplification.

Due to the temperature dependency of the heated resistor 81, which resistor represents the total range of regulated output in the rectifying feedback network 8 of the pilot control line amplifier, the control range of the amplification of the line amplifier changes relatively greatly with its surrounding temperature. The minimum amplification of the line amplifier can, for example, be adjusted by a resistor 82 connected in parallel with the resistor 81 in the high frequency path at a given temperature.

To determine the maximum amplification, primarily the adjustment with a series resistance in the high frequency path will be possible which, however, would entail the disadvantage of a considerable decrease of the controlled steepness of the characteristic, and in addition would require an accurately stepped spectrum of very low ohmic resistors, which for technological reasons can only be produced with a considerable additional expense and would also present difficulties in installation.

Figure 2:
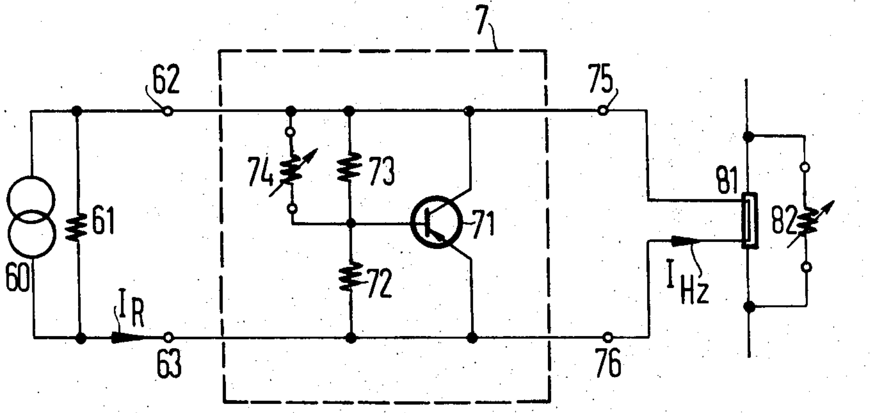
FIG. 2 is a schematic circuit diagram of a limitation arrangement for the heating current of the separately heated resistor of the amplifier illustrated in FIG. 1.

FIG. 2 illustrates the circuit arrangement of the limiting arrangement 7 which may be employed in the apparatus of FIG. 1. The limiting arrangement 7 provides for limitation of the amplification of the line amplifier to an accurate value without having the steepness decreased considerably and without requiring a plurality of extremely accurate low ohmic resistors.

The limiting arrangement 7 is connected between the output terminals 62 and 63 of the differential amplifiers 6 and the input terminals 75 and 76 of the heating coil of the indirectly heated resistor 81. The output of the differential amplifier 6 can therefore be characterized by the current source 60 and the parallel connected internal resistance 61.

The collector-emitter path of the transistor 71 is connected in parallel to the terminals 75 and 76 of the heating coil of the heated resistor 81 in the limiting arrangement 7, which stage is also connected to a voltage divider comprising a plurality of resistors 72, 73 and 74. Of the resistors 72–74, the resistor 72 is connected in parallel to the base-emitter path of the transistor 71 and the resistors 73 and 74 are connected in parallel to the base-collector path of the transistor 71. The accurate value of the maximum amplification of the line amplifier is adjusted with the adjustable resistor 74.

As long as the direct current which is supplied by the current source 60 lies in the lower or middle part of the total range of control or output the limitation arrangement 7 is comparatively highly ohmic so that the direct current supplied by way of the terminals 62 and 63 flows almost at full strength through the heating coil by way of the terminals 75 and 76. When reaching a critical value of the current $I_{Hz}$ through the heating coil a corresponding voltage occurs at the terminals 75 and 76 of which a partial direct voltage at the resistor 72 begins to open the base-emitter path of the transistor 71. As a result, the collector-emitter path goes to a low ohmic condition and thus limits, by cooperation of the internal resistor 61 of the differential amplifier 6, the heating current $I_{Hz}$. The limitation arrangement 7 requires, apart from the control current $I_R$, no current supply and is highly ohmic up to the point where it is limited so that the control steepness experiences only a very unessential decrease.

It is a further advantage of the circuit arrangement according to the invention that the limited maximum value of the amplification can be kept independent of the surrounding temperature, whereby an optimum control range of the amplification is possible. A compensation of the temperature coefficient of the heated resistor 81 is already achieved in the case of limitation by the temperature coefficient of the base-emitter path of the transistor 71. The temperature compensation can additionally be optimized easily by the provision of a corresponding temperature dependency of the resistors 72, 73 and 74 of the base voltage divider.

Figure 3:
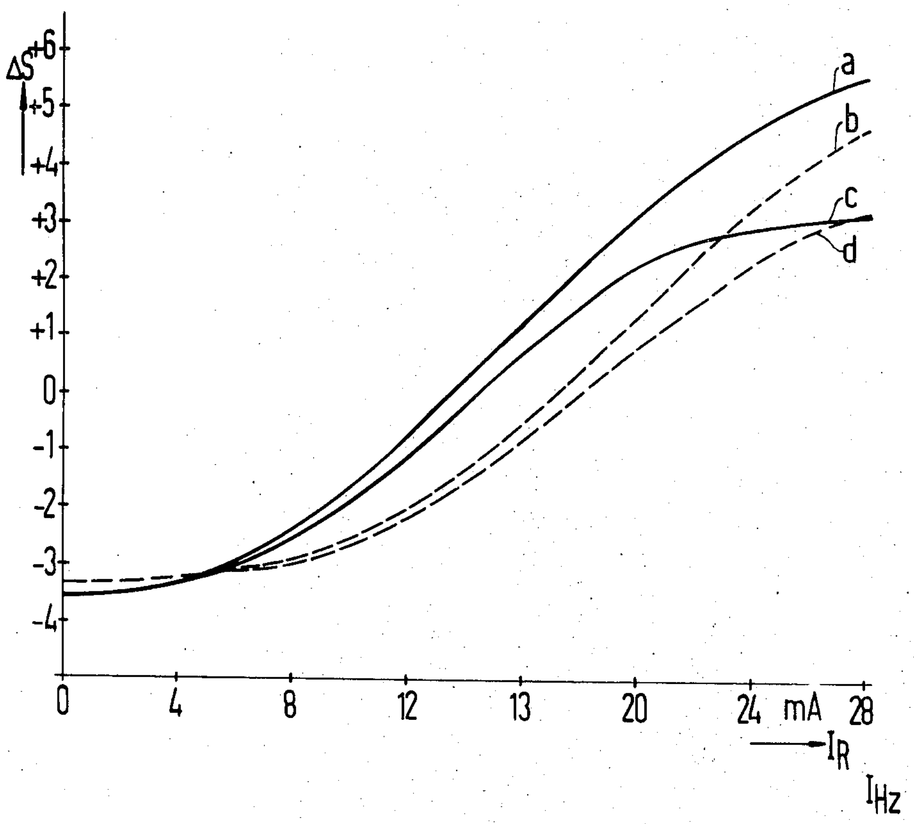
FIG. 3 is a graphic illustration to aid in explaining the mode of operation of the limiting arrangement shown in FIG. 2.

FIG. 3 illustrates a diagram showing the dependency of the change $\Delta S$ of the logarithmic amplification in dB from the control current $I_R$ or from the heating current $I_{Hz}$ which is the control current $I_R$ in the case of the absence of the limiting arrangement 7. The curves *c* and *d* indicate the dependency of the amplification of the control current $I_R$ with limitation by the limitation arrangement 7. The tolerance limits of the samples employed for the indirectly heated resistor 81 are shown in the diagram by the confrontation of the broken and unbroken lines. The curves *a* and *c* represent the heated resistor values which are located at the lower tolerance limit and the curves *b* and *d* represent the heated resistor values which are located at the upper tolerance limit.

Figure 4:
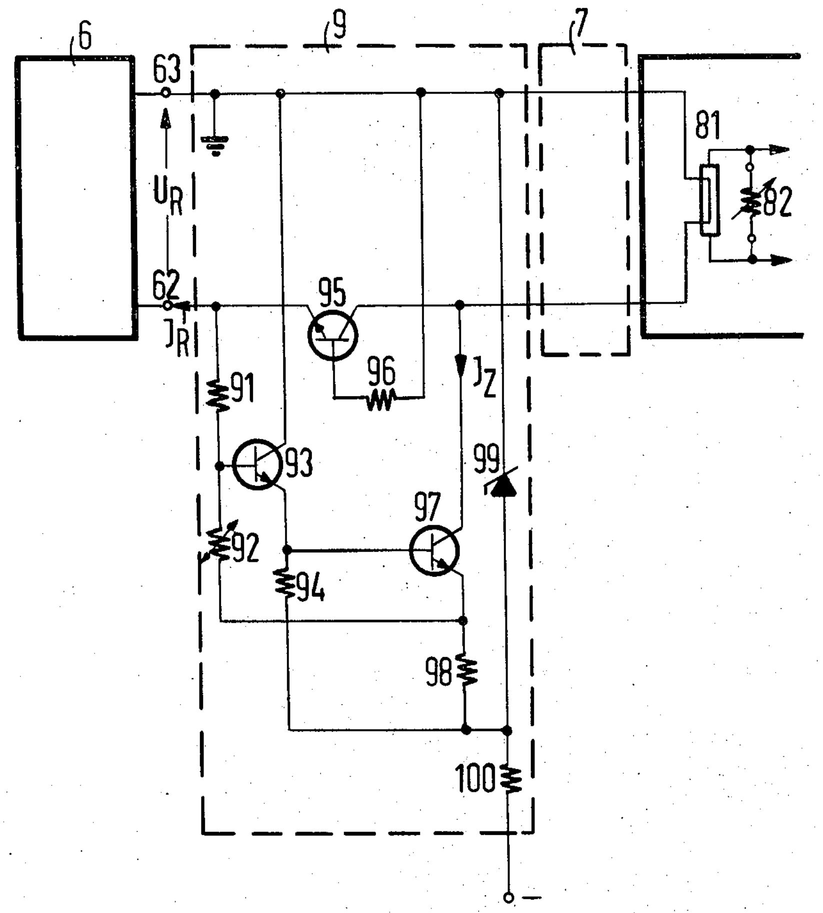
FIG. 4 is a schematic circuit diagram of an arrangement for the creation of an additional current for the heating current of the separately heated resistor of the amplifier according to FIG. 1.

FIG. 4 primarily illustrates a device 9 for the creation of an additional current $I_Z$ for the heating current $I_{Hz}$ of the indirectly heated resistor 81 of the line amplifier. The arrangement constitutes an exemplary embodiment for the solution of the problems described in the following paragraphs.

Due to the temperature dependency of the resistor 81 which is arranged as a correcting element in the rectifying feedback network 8 of the line amplifier, the control range of the amplification of the line amplifier changes relatively greatly with its surrounding temperature. The minimum amplification of the line amplifier can only be adjusted, as already explained, by the resistor 82 connected in parallel with the heated resistor 81 in FIG. 2 and the high frequency path in view of a certain temperature, in particular the highest temperature which is expected; however, the resulting temperature coefficient of the controlled resistor is so large that there is the basic danger that with smaller values (corresponding to the high pilot levels) of the control current $I_R$ or the output voltage $U_R$, respectively, of the control arrangement 6, and simultaneously occurring low surrounding temperature, the loop gain the feedback network will exceed the maximum admissible upper limit. By reducing the parallel resistor 82, this danger can be limited only by a drastic waiver of the available degree of control of the line amplifier.

The above problem is solved by the arrangement 9 illustrated in FIG. 4 which is connected between the control arrangement 6 and the heating coil of the resistor 81. In addition, the limitation arrangement 7 of FIG. 2 is connected between the arrangement 9 and the heating coil of the resistor 81.

The arrangement 9 creates an additional current $I_Z$ which adds its effect to the control current $I_R$ of the control arrangement 6. This additional current $I_Z$ accepts in lower values of the output voltage $U_R$ of the control arrangement 6 a prescribed value, which in case of low surrounding temperature is larger than the value which occurs in case of higher surrounding temperature. In case of an increasing output voltage $U_R$ of the control arrangement 6 the additional current $I_Z$ is decreased.

The arrangement 9 comprises three transistors 93, 95 and 97 which are connected to the terminals 62 and 63 and to the heating coil of the resistor 81 by way of a plurality of resistors 91, 92 and 96, and to an operational supply by way of a resistor 94, a resistor 98 and a resistor 100. The arrangement also includes a Zener diode 99 connected between the resistor 100 and the terminal 63 which in this particular instance is grounded.

The transistor 93 which evaluates the output voltage $U_R$ of the control arrangement 6 has its collector connected to the terminal 63 of the control arrangement 6 and has its emitter connected, on one hand, by way of the resistor 91 with the other ouptut terminal 62 of the control arrangement 6 and, on the other hand, by way of a temperature dependent resistor 92 with the emitter of the transistor 97 creating the additional current which, by means of its collector, feeds the additional current $I_Z$ to the heating coil. The internal resistance of the output 62, 63 of a control arrangement 6 is now greatly dependent on the position of the control and decreases in case of lower values of the output voltage $U_R$ up to values of approximately 25 to 30 ohms. On the other hand, however, the value of the resistance of the resistor 81 amouhts to approximately 100 ohm. In order to avoid that the additional current $I_Z$ which should be especially effective in particular in case of small values of the output voltage $U_R$ flows into the internal resistance of the control arrangement 6, the transistor 95 which is connected into the heating path is provided. The transistor 95 is connected on its emitter side with the terminals 62 and on its collector side with the heating coil of the resistor 81 and the collector of the transistor 97 which creates the additional current $I_Z$. The base of the serially connected transistor 95 is connected by way of the resistor 96 with the output terminal 93 of the control arrangement 6. In view of the control current $I_R$ which is created for the control arrangement 6, the transistor 95 is connected into the base circuit so that its collector is highly ohmic with respect to the feed point of the additional current $I_Z$ and avoids a reverse flow to the output of the control arrangement 6. Moreover, the high impedance output of the transistor 95 improves the limitation effect of the limitation arrangement 7.

A constant supply voltage is created for the transistors 93 and 97 by means of the breakdown diode 99 and the series resistance 100. For this purpose, the cathode of the breakdown voltage 99 is connected with the output terminal 63 of the control arrangement 6, the series resistor 100 is connected to the negative potential of the supply voltage and the stabilized voltage at the connecting point of the breakdown diode 99 and the resistor 100 is fed by way of the resistor 94 to the emitter of the transistor 93 and by way of the resistor 98 to the emitter of the transistor 97 which is controlled directly on its base side from the emitter of the transistor 93.

The transistor 93 is controlled at its base by the output voltage of the control arrangement 6 in such a way that in case of a smaller output voltage $U_R$ the transistor 93 is conductive if the temperature dependent resistor 92 is highly ohmic due to low temperature. At the emitter resistor 94 of the transistor 93 a corresponding voltage decrease will occur which opens the base-emitter diode of the transistor 97 whose function is to provide the additional current $I_Z$ to the heating element of the resistor 81. The temperature dependent resistor 92 which is connected between the emitter of the transistor 97 and the base of the transistor 93 in addition causes a defined measure of coupling so that the control effect, in view of the voltage $U_R$, and in view of the surrounding temperature is still increased. In case of high temperature, the base potential of both the transistors 93 and 97 is decreased so far that the additional current does not flow into the heating coil, due to the low value of the temperature dependent resistor 92.

Attention is invited that the temperature dependent resistor 92 should be arranged in proximity to the resistor 81 so that there is necessarily a thermal coupling of both elements. This arrangement has the advantage that during the time in which the amplifier has not yet reached its operating temperature, the additional heating of the resistor 91 which is caused by the additional current $I_Z$ compensates the cold condition of the amplifer. The purpose of this measure is to avoid excessive feedback coupling of the amplifier in the cold condition and an attendant exceeding of the limit of stability.

The arrangement has the advantage that in case of small values (corresponding to high pilot values) of the output voltage of the control arrangement, or in case of failure or temporary absence of the control arrangement, and in all operational or surrounding temperatures, respectively, the line amplifier can be controlled up to a very precise minimum amplification whereby the stability of the feedback coupling, which means a sufficient safe distance with respect to self excitation, is secured without the limit for the degree of safe amplification control being exceeded. It is also possible to temporarily remove the unit containing the control arrangement 6 whereby the admissible minimal amplification of the line amplifier will occur automatically.

Figure 5:
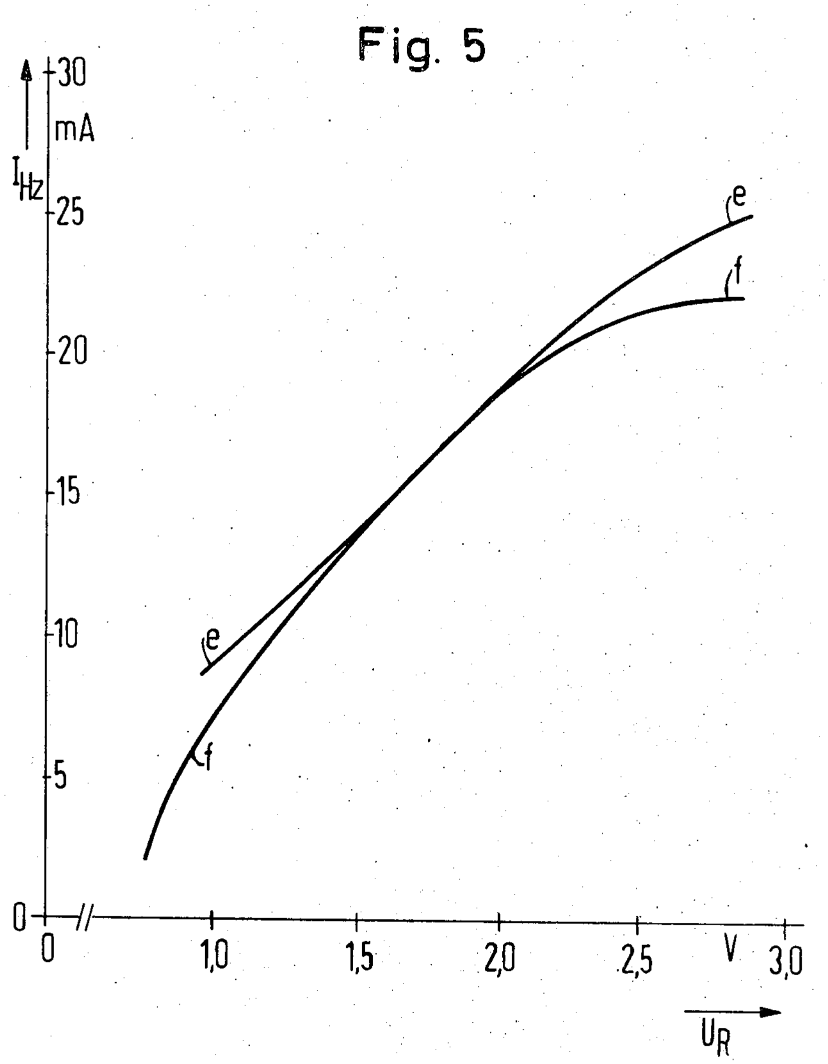
FIG. 5 is a graphic illustration to aid in explaining the mode of operation of the arrangement shown in FIG. 4.

FIG. 5 illustrates, in graphic form, the dependency of the heating current $I_{Hz}$ on the output voltage $U_R$ of the control arrangement 6 whereby the curve e applies to low temperatures and the curve *f* applies to high temperatures. The additional current $I_Z$ causes, in the case of minimum or failed output voltage $U_R$, respectively, that at low temperatures according to the lower end of the curve *e* the minimum heating current $I_{Hz}$ amounts to approximately 9 mA and at high temperatures according to the curve *f* amounts approximately to 2 mA. The deviation of the curves *e* and *f* from proportionality in the upper range of the output voltage $U_R$ of the control arrangement 6 is caused by the limitation effect of the arrangement 7.

Although I have described my invention by reference to certain specific embodiments thereof, many changes and modifications of my invention become apparent to those skilled in the art without departing from the spirit and scope of the invention. I therefore intend to include within the patent warranted hereon all such changes and modifications as may reasonably and properly be included within the scope of my contribution to the art.

I claim:

1. A pilot controlled carrier frequency line amplifier arrangement comprising: an amplifier having an input and an output; a feedback network connected between said output and said input of said amplifier and including a temperature responsive variable resistor and a heating coil for said variable resistor energizable to control the frequency pass characteristic of said arrangement; and a control circuit connected between said amplifier and said heating coil for controlling the energization of said heating coil in accordance with the magnitude of the pilot, said control circuit including a pilot evaluating means connected across said heating coil for deriving a current representing the relative value of the pilot with respect to a reference and a limiting transistor having a base, an emitter and a collector, the collector-emitter path connected across said heating coil, and a voltage divider connected in parallel with said pilot evaluating means and having a tap connected to said base of said limiting transistor for controlling the current applied to said heating coil, said control circuit further comprising an evaluating circuit connected to said pilot evaluating means and to said limiting transistor for feeding an additional current to said heating coil, said evaluating circuit including a first transistor circuit for evaluating the output voltage of said pilot evaluating means, a second temperature responsive resistor for sensing the environmental temperature of said feedback network, and a second transistor circuit connected to said first transistor circuit and to said second temperature responsive resistor and to said heating coil and controlled by said first transistor circuit and said second temperature responsive resistor to provide said additional current inversely proportional to the output voltage of said pilot evaluating means and inversely proportional to the environmental temperature sensed by said second temperature responsive resistor.

2. A pilot controlled carrier frequency line amplifier arrangement according to claim 1, wherein said second temperature responsive resistor is located in close proximity to the first-mentioned temperature responsive resistor.

3. A pilot controlled carrier frequency line amplifier arrangement according to claim 1, wherein said evaluation circuit includes a third transistor circuit comprising a transistor having a base, an emitter and a collector, said base and said emitter being serially connected to one terminal of said heating coil between said heating coil and said pilot evaluating means, and said base connected to the other terminal of said heating coil.

4. A pilot controlled carrier frequency line amplifier arrangement according to claim 1, wherein said pilot evaluating means comprises a pilot detection circuit connected to said output of said amplifier, and a differential amplifier having a pair of inputs, one of which is connected to said pilot detection means and the other of which is connected to a reference, and a pair of output terminals connected across said heating coil.

* * * * *